POLAROMIC SEMICONDUCTOR DEVICES
Filed Aug. 27, 1969 2 Sheets-Sheet 1
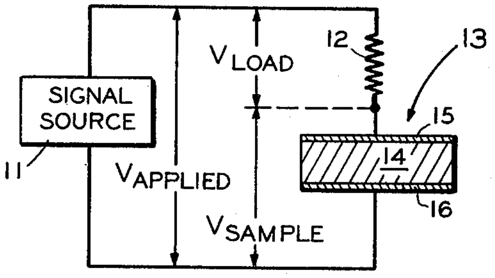
FIG. 1
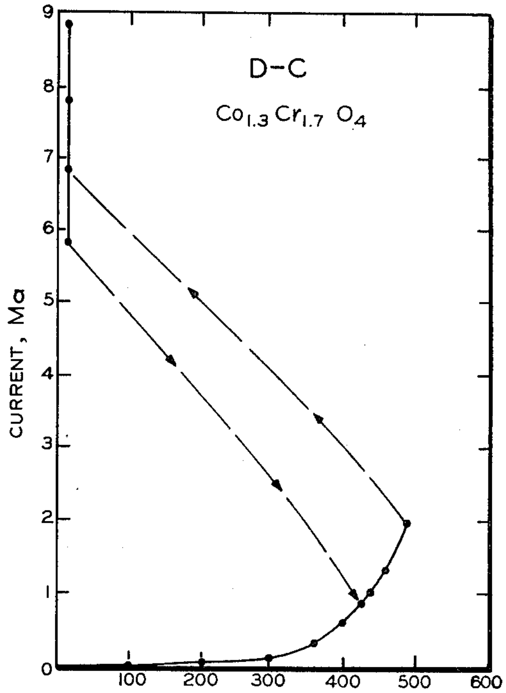
FIG. 2
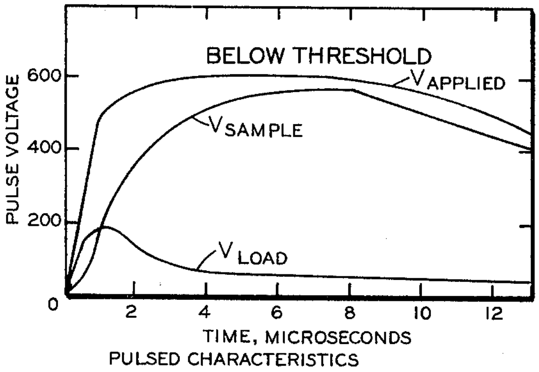
FIG. 4 $Co_{1.3}Cr_{1.7}O_4$ t=0.006 Cm
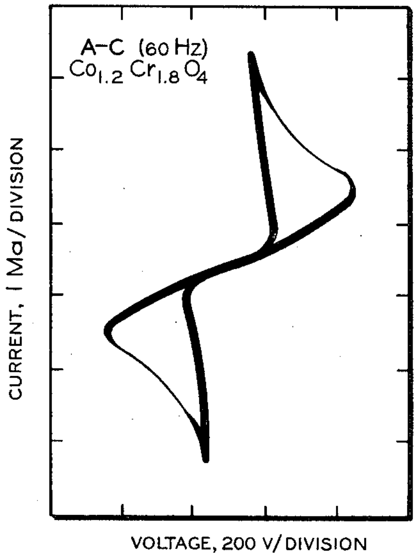
FIG. 3
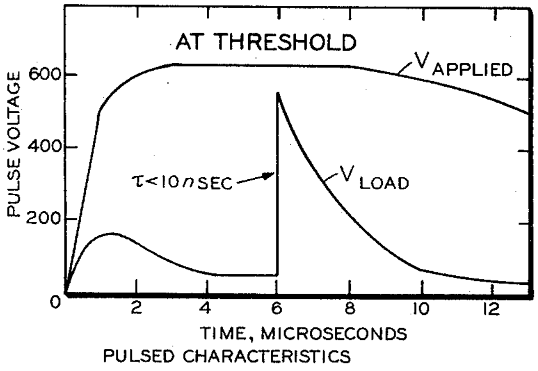
$Co_{1.3}Cr_{1.7}O_4$ t=0.006 Cm
FIG. 5
INVENTORS
PAUL J. FREUD &
AHARON ZEEV HED
BY GRAY MASE & DUNSON
BY Philip M. Dunson
ATTORNEYS Aug. 22, 1972 A. Z. HED ET AL 3,686,096

POLARONIC SEMICONDUCTOR DEVICES

Filed Aug. 27, 1969 2 Sheets-Sheet 2

INVENTORS
PAUL J. FREUD &
AHARON ZEEV HED
BY GRAY MASE & DUNSON
BY Philip M. Dunson
ATTORNEYS

United States Patent Office 3,686,096

Patented Aug. 22, 1972

3,686,096

POLARONIC SEMICONDUCTOR DEVICES

Aharon Zeev Hed, Columbus, and Paul J. Freud, Worthington, Ohio, assignors to Battelle Memorial Institute, Columbus, Ohio Filed Aug. 27, 1969, Ser. No. 853,472
Int. Cl. H01b *1/06;* H01l *3/00*
U.S. Cl. 252—519 3 Claims

ABSTRACT OF THE DISCLOSURE

Devices wherein high electric fields are applied to low conductivity crystalline materials where the major mode of conduction is by hopping of localized small polarons. Mobility increases with field up to a threshold field where delocalization of the small polaron occurs, mobility increases discontinuously by a few orders of magnitude, and the conduction mode is in a polaronic band. Typical materials include spinel $Co_{1+x}Cr_{2-x}O_4$, $Co_{1-x}Li_xO$, and $$Ni_{1+x}Mn_{2-x}O_4$$

and other oxides, sulphides, selenides, and tellurides of chromium, manganese, iron, cobalt, nickel, copper, other transition metals, and elements 22–29, 39–42, 57–75, and 89–92. I–V characteristics have been determined by D-C and A-C at 60 Hz. and by repetitive pulsing at low repetition rates. Thick specimens were used (.01 to .10 mm.) to assure the bulk nature of the transition. The instability consists of a transition from a non-ohmic low conductivity state at low fields to a high conductivity state when a breakdown field is attained. The high conductivity is sustained until the field is lowered below a minimum field at which the low conductivity state is restored.

BACKGROUND OF THE INVENTION

The need for materials for high-temperature, radiation-resistant, electronic devices has recently become more and more urgent, and economical solutions are still far away. The main handicap of the present approach is that it is still based on the conventional silicon and germanium technology. A semiconductor with the appropriate band gap is chosen, and a study is made of its purification and production of single crystals, from which conventional semi-conductor devices are produced.

When it comes to devices at high temperatures, present approaches fail. The reasons are first, drift of the doped junction and second, contamination. Since all of this technology is based on the p-n junction and its various transmutations, purity and junction stability will always be the main concern, and any advance based on this technology will be only incremental.

Electronic devices are needed whose properties will not stem from the conduction mechanisms of the minority of charge carriers, and which are not influenced by impurities. The concentration of active charge carriers must be much larger than the concentration of carriers induced by minor impurities. The present invention provides semiconductors devices having the desired properties.

SUMMARY OF THE INVENTION

A typical semiconductor device according to this invention comprises a crystalline body and electrical connecting means in contact therewith, the body consisting essentially of an oxide, sulphide, selenide, or telluride of at least one of the elements 22–29, 39–42, 57–75, or 89–92 of the periodic table, having a drift mobility of the majority charge carriers of less than 1 centimeter squared per volt-second at approximately room temperature and in electric fields of less than 10 volts per centimeter. The drift mobility increases continuously with increasing electric field up to a threshold field, and then increases discontinuously.

The device may comprise also means responsive to electric signals for providing a continuously variable electric field thereto for processing, such as amplification, of the signals, or for providing an electric field that is variable about the threshold field for switching between low and high drift mobility therein. Means responsive to direct-current input may be provided for varying an electric field to the device in such manner as to generate an oscillating current therein.

Means may be included for providing a variable electric field to the device for providing a rapid transition for a state of low conductivity to a state of high conductivity therein, as by selectively increasing the field to a strength sufficient to modify the Holstein formulation of the small polaron motion through a reduction of the hopping activation energy, and thus of the time of stay, below a critical value at which the small polaron is delocalized and the mobility increases discontinuously to a polaron band mobility, and selectively decreasing the field to a value low enough to increase the stay time above the critical value and thus to cause self trapping and a discontinuous jump back to the localized small polaron mode.

The device may include means for providing and varying an electric field thereto in such manner as to vary the optical absorption properties therein, typically in such manner as to control the transmission of light or other radiation therethrough, as by varying the index of refraction therein such manner as to provide deflection, phase shifting, and frequency shifting, of radiation directed thereto. One form of device may include means for providing and varying an electric field thereto in such manner as to provide and control electroluminescence therein.

The body of the device preferably consists essentially of a bulk material having a polycrystalline spinel structure, such as an oxide, sulphide, selenide, or telluride of chromium, manganese, iron, cobalt, nickel, copper, or other transition metal. Materials that are especially useful include spinel $Co_{1+x}Cr_{2-x}O_4$, where $x$ is about 0.0 to 0.3; spinel $Ni_{1+x}Mn_{2-x}O_4$, where $x$ is about $-0.1$ to 0.1; and cobalt oxide doped with lithium, $Co_{1-x}Li_xO$, where $x$ is up to about 0.05. Specific materials that have been used in the device include $Co_{1.2}Cr_{1.8}O_4$, $Co_{1.3}Cr_{1.7}O_4$, $NiMn_2O_4$, and $Co_{.994}Li_{.006}O$.

BRIEF DESCRIPTION OF THE DRAWINGS

FIG. 1 is a schematic diagram showing a semiconductor device according to this invention and associated circuitry.

FIG. 2 is a graph showing the D-C current-voltage characteristic for a semiconductor device as in FIG. 1 wherein the body consists essentially of spinel $Co_{1.3}Cr_{1.7}O_4$.

FIG. 3 is an oscillogram showing the A-C (60-Hz.) current-voltage characteristic for a similar device wherein the body consists essentially of spinel $Co_{1.2}Cr_{1.8}O_4$.

FIG. 4 is a graph showing applied voltage, sample voltage, and load voltage versus time, below threshold voltage, for pulsed voltage to a device as in FIG. 2.

FIG. 5 is a graph similar to FIG. 4 showing applied voltage and load voltage versus time, at threshold voltage, for pulsed voltage to a device as in FIG. 2.

DESCRIPTION OF THE PREFERRED EMBODIMENTS

Figure 6:
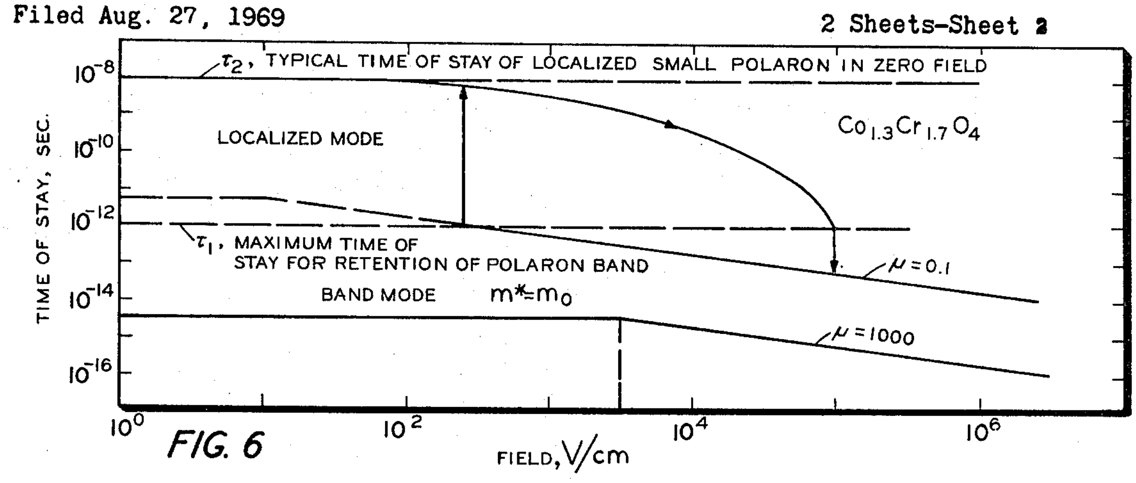
FIG. 6 is a graph showing time of stay as a function of applied field.

In FIG. 1, a signal source 11 is connected in series with a load 12 to a semiconductor device 13 comprising a crystalline body 14 and electrical connecting means 15, 16 in contact therewith. The signal source 11 may comprise any conventional D-C or A-C generator or other suitable means for providing in the circuit signals such as to provide an electric field to the semiconductor device 13 as described in the summary above or in the examples below. The load 12 may be any suitable resistance, inductance, capacitance, or combination of components, depending on the mode of operation to be provided. In the examples it is typically a 0.1 megohm resistance. The electrical connecting means 15, 16 may be made of any suitable metal or other electrically conductive material. They are connected to the upper and lower surfaces, respectively, of the crystalline semiconductor body 14. The body 14 comprises a bulk material which may be as thick as 0.01 to 0.1 millimeter and may consist essentially of an oxide, sulphide, selenide, or telluride of at least one of the elements listed in the summary.

EXAMPLES

An instability has been observed in the current-voltage characteristic of the transition metal oxide, spinel $$Co_{1+x}Cr_{2-x}O_4$$

with $x$ up to about .3, spinel $Ni_{1+x}Mn_{2-x}O_4$ with $x$ about −.1 to .1, and in lithium doped cobalt oxide $Co_{1-x}Li_xO$ with $x$ up to about .05. This effect is interpreted in terms of the delocalization of the Holstein (1) type localized small localized small polarons under high yield.

The spinel samples were polycrystalline in the shape of discs .05 to .10 mm. thick. Cobalt rich compositions were chosen to introduce charge carriers through the mechanism of controlled valency (2), and thick specimens were used to eliminate any possible thin film effects. The room temperature low field conductivities of the spinel specimens ranged from $10^{-5}$ to $10^{-8}$ (ohm-cm.)$^{-1}$, depending on the value of $x$, while the conductivity of the compound $CoCr_2O_4$ is of the order $10^{-11}$ (ohm-cm.)$^{-1}$. The instability observed consisted of a transition from a low conductivity state at low fields to a high conductivity state when a threshold field is attained. The high conductivity state is sustained until the field is lowered below a minimum field at which point a transition takes place back to the low conductivity state. FIG. 2 illustrates the transitions using a D-C voltage on a Co-Cr spinel with $x$=3. The sample disc was held between spring loaded contacts with silver applied to the contact area of the sample A D-C voltage was applied across the sample and a $10^5$ ohm load resistor in series. The D-C I-V characteristic shown in FIG. 2 should be cycled and the high and low threshold fields were reproducible to ±5 percent. The resistivity changed from a low field value of $10^6$ ohm-cm. to $10^2$ ohm-cm. in the high conductivity state. The measured sample resistances include contact resistance.

The I-V characteristic for 60 Hz. applied voltage is shown in FIG. 3 for a $Co_{1+x}Cr_{2-x}O_4$ ($x$∼.2). This characteristic trace was taken with the peak voltage just above the threshold voltage. The rapid transition to the low conductivity state is seen as the faint portion of the scope trace. Positive and negative portions of the trace are symmetric indicating the absence of rectifying effects.

A relaxation oscillation was produced with a high load resistance in series with the sample. The measured frequency of 50 kHz. was controlled by the RC time constant of the sample and load resistance.

To minimize joule heating and to determine the speed of the transition, high voltage pulsing was used. Voltage pulses with 0.5 μsec. time, 10 to 20 μsec. duration, and repetition rate of 1–100 Hz. were applied across a sample of Co-Cr spinel with $x$=0.3) and a $10^5$ ohm load resistor in series. The current response was observed across the load resistor on a 50 mHz. scope as the pulse amplitude was varied to the maximum of 600 volts. FIG. 4 shows the shape of the applied voltage pulse and the shape of the voltage across the sample, at a level below threshold voltage. The lag of the sample voltage is due to the estimated 10 pf. capacitance of the sample and sample holder. At the maximum voltage which the pulsing system could deliver (600 volts) the transition from low conductivity to high conductivity was observed as a discontinuity in the sample current. FIG. 5 shows the voltage across the load resistor as a function of time. The discontinuity occurs at a time corresponding to the maximum in the sample voltage which lags behind the applied voltage. The peak in the current at 0.5 μsec. is due to the sample capacitance. On an expanded time scale the current discontinuity was observed to occur within a time less than 10 nanoseconds.

The response time measurement is limited by the RC time constant of the sample in the high conductivity state. If one assumes that the sample transition is instantaneous then one can calculate an RC response time of the sample-load circuit. For example, if the sample resistance in the high conductivity state is 1000 ohm (see FIG. 2) and the capacitance is 10 pf., then the response time of the current to a discontinuous change in conductivity is $10^{-8}$ sec. Similarly, the current response time when the sample goes from high conductivity to low conductivity is governed by the load resistance (which is less than the low conductivity sample resistance) and sample capacitance. This time constant is the order of 1 μsec. The rapid and slow responses of the current are seen in FIG. 5. The actual transition time might well be much shorter than the 10 nanoseconds measured.

With a load resistance of $10^{-5}$ ohms the field after switching on the sample was not high enough to maintain the high conductivity state due to current limitations, and the sample switched immediately back to the low state as is indicated by the current decay back to the low value. The pulsed characteristic is seen to differ from the D.C. characteristic (FIG. 2) in the values of the high and low threshhold fields observed. This can partially be attributed to dimensional and compositional differences in the various samples used. It can also be partially attributed to temperature dependences of the threshold fields and the joule heating of the sample when operating under D.C. conditions, as opposed to the pulsed conditions.

Figure 12:
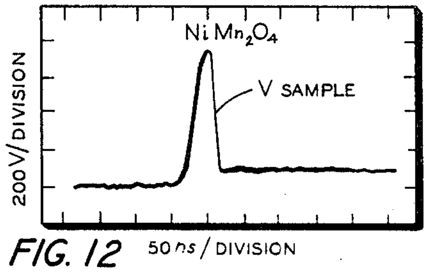
FIG. 12 is a similar oscillogram of voltage across the device, at a larger scale than in FIG. 11, showing low to high conductivity switching in less than 5 nanoseconds.
Figure 11:
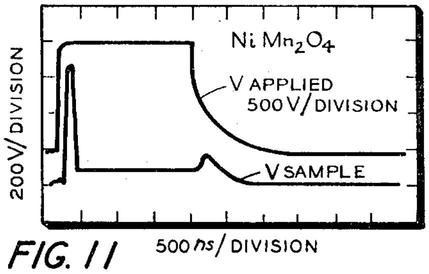
FIG. 11 is an oscillogram of voltage versus time showing pulsed voltage characteristics of a device as in FIG. 1 wherein the body consists essentially of spinel $MiMn_2O_4$, .010 cm. thick, with silver contacts. The upper trace shows the applied pulse across the device and a 1000 ohm load resistor: the lower trace shows the voltage across the device only.

Pulsed voltage having 25 nanosecond rise time was applied to a sample of $NiMn_2O_4$ spinel and switching occurred at a voltage of the order of 700 volts for a sample .01 cm. thick. FIG. 11 (upper trace) shows the shape of the voltage pulse applied across the sample and 1000 ohm series load resistor. The pulse has a rise time of the order of 25 nanoseconds and the switching from low to high conductivity state at 700 volts on the leading edge of the pulse and from high to low conductivity state on the decay of the pulse. The sample resistance switches from a value of 1000 ohms in the low conductivity state to 75 ohms in the high conductivity state. FIG. 12 shows the switching from low to high conductivity state on an expanded time scale. The switching time is seen to be less than 5 nanoseconds which is about the resolution of the 100 mHz. oscilloscope used.

Figure 7:
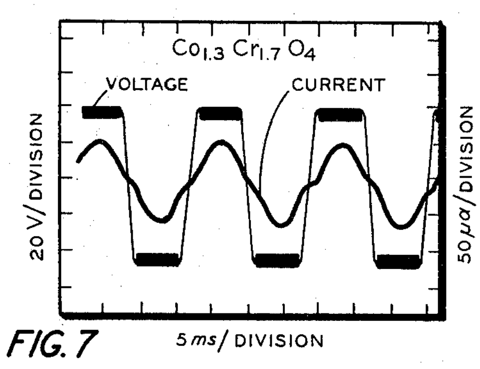
FIGS. 7, 8, and 9 are oscillograms of current and voltage versus time showing relaxation oscillation with 60 Hz. A-C voltage applied to a device as in FIG. 2.
Figure 10:
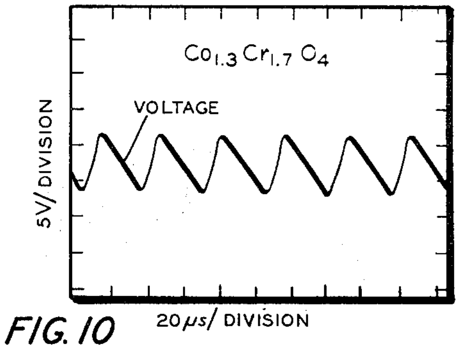
FIG. 10 is a similar oscillogram of voltage only, at a larger scale than in FIGS. 7–9.
Figure 8:
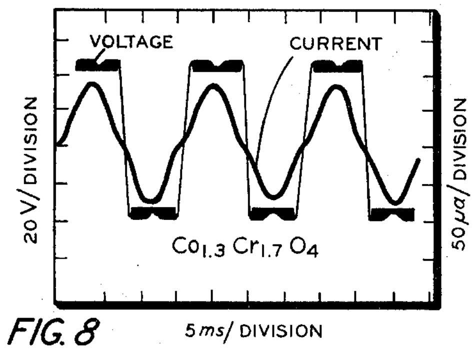
Figure 9:
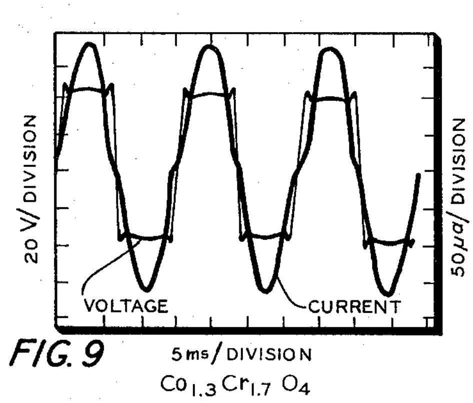

A relaxation oscillation was observed for a $Co_{1.3}Cr_{1.7}O_4$ spinel sample which was thinned to about .01 mm. The (1) (2)—See "References" at end of specification.

value of the load resistance in series with the sample was chosen such that when the sample made the transition to the high conductivity state the voltage drop across the sample was not large enough to maintain the high conductivity state and the sample would switch back to the low state. FIGS. 7, 8, and 9 show the sample voltage and load current for a 60 Hz. A-C applied voltage as the applied voltage is increased. The frequency of the oscillation as seen in FIG. 10 is 30 kHz. and is made up of a fast (5 μs. discharge) voltage decrease and a slow (25 μs. charge) voltage increase. The discharge cycle is controlled by the RC time constant of the sample resistance in the high conductivity state and the capacitance of the sample, scope and cable (10–50 pf.). The charge cycle is controlled by the above capacitance and the load resistance ($10^6$ ohm). The ratio of the two time constants is then the ratio of load to high conductivity sample resistance, 5:1. Contact resistance, which adds to the effective sample resistance, was quite high on this sample resulting in the low resistance ratio. As the applied voltage was increased (FIGS. 8 and 9) the oscillations ceased at a point where the sample current exceeded 75 μa. For currents above this level the sample voltage is high enough to maintain the low conductivity state.

In FIG. 7 the sample voltage for switching from the high to low state is seen to be constant indicating the constant minimum voltage required to maintain the high conductivity state. The characteristics of the relaxation oscillation are important in ruling out the possibility of a thermal runaway type negative resistance. This type of instability cannot account for the two distinct time constants and the constant minimum voltage of the oscillation.

A similar transition was found in $Co_{.994}Li_{.006}O$ in the form of a single crystal disc .05 mm. thick. Due to the low room temperature resistivity ($10^3$ ohm-cm.), the measurement was performed at reduced temperature ~200° K. with 60 Hz. applied voltage. An I–V characteristic similar to FIG. 2 was obtained with a threshold voltage for the low to high transition of approximately 200 volts. The speed of the transition was not obtained by pulsing due to the current limitation of the pulsing system.

The above results illustrate a field induced conductivity transition in two low mobility transition metal oxides. The following model describes the mechanism we believe is responsible for this transition.

The interpretation of the observed effect is based on the assumption that in the low conductivity state, the mode of conduction is by hopping of small polarons. The small polaron model has been applied successfully to interpret the optical (3) and transport (4) properties of CoO. While for $CoCr_2O_4$ no actual determination of the conduction mode has been made, it is plausible to assume the same model since the inter-cation distance is similar to that in CoO, resulting in a vanishing $3d$ band.

The Hamiltonian for small polarons has been given by many authors (1, 5, 6). We will use here a version of Holstein's formulation (a linear chain of diatomic molecules):

$$H=\sum_{n,\,q} J(q)\,a_n^+a_{n+q}-A\sum_n a_n^+a_nu_n+\sum_n\left(\frac{M\dot{u}_n}{2}+\frac{M\omega_0^2u_n}{2}\right)+H(E) \quad (1)$$

For the sake of simplicity we disregard dispersion. $a^+_n$ and $a_n$ are the regular generation and annihilation operator at the site $n$, $u_n$ is the relative displacement of the atoms of diatomic molecules and M their reduced mass. The first term provides for the exchange interaction, and with $J(q)=0$ for $q\neq\pm1$, only nearest neighbors interaction are assumed important. The second term represents (1) (3) (4) (5) (6)—See "References" at end of specification.

a strong electron-phonon interaction, and is assumed linear with the displacements $u_n$. The third term is the energy of the system of phonons. The interaction with the field can be represented by:

$$H(E)=eE_{n,m}\Sigma a_n^+a_mM_{nm} \quad (2)$$

where $M_{nm}$ are the matrix elements:

$$M_{nm}=\int \varphi_n^*eEx\varphi_m dx \quad (3)$$

An exact solution to the Hamiltonian without the field is not available; it is, therefore, not possible to obtain a rigorous expression for the matrix elements of the field operator. The wave function $\varphi_n$ of the small polaron may be asusmed to be strongly localized over the displacement $u_n$. The matrix element $M_{nn}$ may be approximated by $eE\epsilon(n)u_n$.

The sum of the first off diagonal elements $$eE\sum_{\substack{n\\ q=\pm1}} a_n^+a_{n+q}\int \varphi_n^*x\varphi_{n+q}dx$$

should influence the first term in the Hamiltonian (1). However, we assume this interaction to be minimal due to the strong localization of $\varphi_n$. Ultimately, this interaction should be included in the model, but it seems that it will influence the actual value of the breakdown voltage but not its mere occurrence.

The physical reasoning behind this choice of H(E) is as follows. The jump process is occurring during times much shorter than $10^{-14}$ sec. (an instantaneous coincidence of the neighboring site being exited to the state of the charged site) and it can be assumed that no energies smaller than .1 ev. can be added to the charge (Heisenberg) which will involve fields of the order of $10^8$ to $10^9$ v./cm. All the interaction with the field is therefore localized on the displacement $u_n$. $\epsilon(n)$ is a microscopic dielectric constant of the "sites," and is probably of the order or larger than the macroscopic dielectric constant of the media.

The Hamiltonian (1) may be written now as $$H=\sum_{\substack{n\\ q=\pm1}} Ja_n^+a_{n+q}-[A-eE\epsilon(n)]\sum_n a_n^+a_nu_n+\sum_n\left[\frac{M\dot{u}_n}{2}+\frac{M\omega_0^2u_n}{2}\right] \quad (4)$$

The Hamiltonian is of the same form as in reference 1, with the difference that A is field dependent. At a constant field E, the mobility will have the following form (following reference 1, and taking the simplified form).

$$\mu=\frac{(\pi)^{1/2}}{h}\,\frac{J^2}{A_{eff}}\,\frac{(M\omega_0^2)^{1/2}}{kT}\exp\left[-E_a/kT\right] \quad (5)$$

where $E_a=A_{ett}^2/4M\omega_0^2=(A-eE\epsilon(n))^2/4M\omega_0$

We see that the effective activation energy decreases and hence the mobility increases continuously with the field. There is a small increase due to $A_{eff}$ in the denominator, but the exponent is clearly leading.

The breakdown of the localization occurs when the relation $2J<A_{eff}/2M\omega_0^2$ is no longer valid.

Putting an equality sign for breakdown of the localization we obtain $E_b$, the field at which breakdown of the localization occurs:

$$E_b=\frac{A-(4JM\omega_0^2)^{1/2}}{e\epsilon(n)} \quad (6)$$

With $M=3.6\ 10^{-26}$ kg., $\omega_0=10^{13}$ sec$^{-1}$, $A=1.5\ 10^{-10}$ joule/meter, $\epsilon(n)=10$, and $J=.05$ ev., we obtain $E_b=3\cdot10^5$ v./cm. and with $\epsilon(n)=100$, $E_b=3\cdot10^4$ v./cm.

These field values correspond to the threshold field range observed in our experiments. Introduction of off diagonal elements in the Hamiltonian will have an effect on the actual value of $E_b$. The approximate nature of the calculation here does not warrant the effort needed to refine the Hamiltonian to include these effects.

It can be seen from expressions (5) that at low fields the mobility is almost unchanged, and as the field is increased, the mobility changes are larger. The mode of conduction after delocalization, involves probably motion of charge in a polaronic band. The electron phonon interaction is still strong but not enough to cause localization and the mobility is undergoing a sudden increase at the breakdown field.

To obtain a better feeling of the important parameters influencing the transition, we propose an intuitive physical picture of the formal model.

First, we define a time of stay $\tau$ as the time which a charge carrier is at an atomic site. This is a real physical quantity for the localized small polaron but becomes less physical as we consider a band picture with decreasing effective masses.

For very narrow bands ($m^*>100m_0$), we can calculate times of stay of $10^{-13}$ sec. and less about the relaxation of the optical phonon. In this range of interaction times with a given site, polarization and self-trapping can occur forming the small polaron and causing a discontinuous change in the stay time to values the order of $10^{-8}$ sec. The picture obtained is a range of stay times ($\tau$ proportional to $m^{*-1/2}$) up to a critical value $\tau$ for band-type conduction and then a gap in allowed values of $\tau$ up to the localized small polaron stay time $\tau_2$.

The electric field was shown above to modify the Holstein formulation of the small polaron motion through a reduction of the hopping activation energy and hence a reduction of the time of stay $$\left(\tau \propto \exp\left(\frac{E_a}{k_T}\right)\right)$$

The instability of the small polaron occurs when the electric field reduces the stay time below the critical value $\tau_1$. At this $\tau$ the small polaron is delocalized and the mobility increases discontinuously to a polaron band mobility. The time of stay in the polaron band at high fields will be less than the thermal time of stay in this state. Therefore, as the field is reduced, the stay time increases and when the critical value of $\tau_1$ is reached, self-trapping occurs again and the stay time jumps discontinuously back to the localized small polaron curve. This sequence is illustrated in FIG. 6. For comparison, the stay time calculated for the case $m^*=m_0$ and $\mu=1000$ cm.$^2$/sec. (broad band) is given although this has no physical meaning.

The model postulated herein predicts that localized small polaron systems will be unstable at high electric fields. Besides the transition metal oxides reported here, the field induced transition should be observed in a large number of other transition metal compounds.

Other phenomena would be expected as the result of an extension of the theoretical interpretation given above. The small polaron is known to have a broad optical absorption band extending over many decades of wave numbers and having a maximum near the visible region of the spectrum. Two effects would occur at high electric fields. First, a change in the shape of the absorption curve to a sharp absorption edge when the material is switched into the delocalized non-small polaronic state. Second, the optical absorption curve would be expected to shift in magnitude and position at electric fields below the threshold field yet high enough to get into the nonlinear region of the transport mechanism.

Besides optical absorption, it is expected that the index of refraction, $n$, will be greatly influenced in both the nonlinear region and the transition region. Electric field induced changes in dielectric constant are expected since the small polaron is a lattice polarization and any changes in this local polarization will greatly influence the macroscopic dielectric constant. A field dependent dielectric constant is useful for deflectors, phase shifting, and frequency shifting $$\left(\text{through } \Delta f \propto \frac{dn}{dt}\right)$$

Finally, there is a possibility that some of the polaronic materials will luminesce when they are switched.

Consider a 3$d$ transition metal in a crystal. The 3$d$ electron energy level is split in the case of a cubic crystal field into two levels which are six fold and four fold degenerate. The energy difference between the two levels are termed 10D$q$ where D$q$ is the crystal field constant.

To determine how the 3$d$ electrons will fill up these levels one compares the pairing energy $\pi$ with 10D$q$. The first three electrons will go into the lowest crystal field level ($t_{2g}$). A fourth electron will go into the $t_{2g}$ level if $\pi<10Dq$ or into the upper crystal field level $e_g$ if $\pi>10Dq$.

Say we have manganese in a cubic crystal field in the plus two ionization state. The five 3$d$ electrons will be in a configuration 2—$e_g$; 3—$t_{2g}$ if $\pi>10Dq$ and 0—$e_g$; 5—$t_{2g}$ if $\pi<10Dq$. This argument is a molecular orbital one depending on localized atomic states. If by some means the pairing energy can be screened then electrons will fill up the $t_{2g}$ level first since $\pi\rightarrow 0$. The high field delocalization of the $t_{2g}$ level of the small polaron provides such a screening. If the 3$d$ ion normally has electrons in the $e_g$ level then they will fall down into the $t_{2g}$ level when $\pi$ becomes less than 10D$q$. If the localized configuration is 2—$e_g$; 4—$t_{2g}$, then the transfer of the two $e_g$ electrons to the $t_{2g}$ level will fill the 6 available $t_{2g}$ states and prevent conduction. This is the inverse transition.

What if the transition of the two $e_g$ electrons is radiative? This will mean that when the electric field is applied and delocalization occurs there is a possibility of a large amount of radiative energy release. Say we have 1 cc. of a transition metal oxide containing $10^{22}$ transition metal ions in the 2—$e_g$; 4—$t_{2g}$ configuration. If 10D$q$ is 1 ev. and all the $e_g\rightarrow t_{2g}$ transitions are radiative, then there will be an energy release of $2\times10^{22}$ ev.$=1000$ joules. This is an extremely large amount of energy and the potential for such a phenomena would be enormous. In addition the optical transition might be triggered by the electric field before the delocalization transition if the electric field can perturb the crystal field splitting enough. If the splitting can be increased so that it is larger than the pairing energy the optical transition would be triggered as it is through a screening of the pairing energy.

The possibility of electroluminescence gives rise to another phenomena. If the electric field induces the release of optical energy through the suggested mechanism then when the field is removed and the material returns to its normal energy state an amount of energy equal to the optical energy released will have to be taken up from the surroundings. This constitutes a type of cooling which would be very useful since the heat pumping would be through optical means involving no thermally conducting connections such as in thermoelectric cooling.

REFERENCES (1) T. Holstein, Ann. Phys. (N.Y.) 8, 343 (1959).

(2) E. J. W. Verwey, P. W. Haaijaman, F. C. Romeijn, and G. W. Oosterhoot, Phillips Res. Rep. 5, 173 (1950).

(3) I. G. Austin, B. O. Clay, C. E. Truner, and A. J. Springthorpe, Solid State Comm. 6, 53 (1968).

(4) B. Fisher and D. S. Tannhauser, J. Chem. Phys. 44, 1663 (1966).

(5) A. L. Efros, Soviet Physics-Solid State 9, 901 (1967).

(6) E. K. Kudinov and Yu. A. Firsov, Zh.Eksp. Teor. Fiz. 99, 867 (1965).

(7) D. C. Mattis, Phys. Rev. Letters 18, 936 (1969).

(8) J. Feinleib and W. Paul, Phys. Rev. 155, 841 (1967).

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A semiconductor device comprising a crystalline body and electrical connecting means in contact therewith, said body consisting essentially of spinel $$Co_{1+x}Cr_{2-x}O_4$$

where $x$ is about 0.0 to 0.3, having a drift mobility of the majority charge carriers that is less than 1 centimeter squared per volt-second at approximately room temperature in electric fields of less than 10 volts per centimeter, and that increases continuously with increasing electric field up to a threshold field.

2. A device as in claim 1, wherein said drift mobility increases discontinuously at said threshold field.

3. A device as in claim 1, said body consisting essentially of a bulk material.

References Cited

UNITED STATES PATENTS

| | | | |
|---|---|---|---|
| 3,327,137 | 6/1967 | Ovshinsky | 317—234 V |
| 3,073,882 | 1/1963 | Kurniek et al. | 252—62.3 T |
| 3,206,618 | 9/1965 | Kallmann | 317—234 V |
| 3,271,591 | 9/1966 | Ovshinsky | 317—234 V |
| 3,395,446 | 8/1968 | Jensen | 317—234 V |
| 3,435,255 | 3/1969 | Jensen | 317—234 V |
| 3,444,438 | 5/1969 | Umblla et al. | 317—234 V |
| 3,480,843 | 11/1969 | Richardson | 317—234 V |
| 3,521,131 | 7/1970 | Buzzelli | 317—234 V |

FOREIGN PATENTS

| | | | |
|---|---|---|---|
| 1,147,356 | 4/1969 | Great Britain | 317—234 V |

OTHER REFERENCES

"Electronic Design," June 21, 1969, pp. 25-32.

DOUGLAS S. DRUMMOND, Primary Examiner

U.S. Cl. X.R.

317—234 V

UNITED STATES PATENT OFFICE

CERTIFICATE OF CORRECTION

Patent No. 3,686,096 Dated August 22, 1972

Inventor(s) Aharon Zeev Hed and Paul J. Freud

It is certified that error appears in the above-identified patent and that said Letters Patent are hereby corrected as shown below:

Column 2, line 28, after "therein" insert -- in --.

Column 3, line 40, "yield" should read -- field --;
line 58, "x=3" should read -- x=.3 --.

Column 4, line 7, after "sec." insert -- rise --;
line 44, "$10^{-5}$" should read -- $10^5$ --.

Column 6, line 5, the formula should read $$H(E) = eE \sum_{n,m} a_n^+ a_m M_{nm}$$

line 55, "$A_{ett}$" should read -- $A_{eff}$ --.

Signed and sealed this 9th day of January 1973.

(SEAL)
Attest:

EDWARD M. FLETCHER, JR.
Attesting Officer

ROBERT GOTTSCHALK
Commissioner of Patents

Dedication 3,686,096.—*Aharon Zeev Hed*, Columbus, and *Paul J. Freud*, Worthington, Ohio. POLARONIC SEMICONDUCTOR DEVICES. Patent dated Aug. 22, 1972. Dedication filed Aug. 2, 1974, by the assignee, *The Battelle Development Corporation.*

Hereby dedicates to the People of the United States the entire remaining term of said patent.

[*Official Gazette November 12, 1974.*]